Oct. 9, 1962  J. F. PRIBONIC ETAL  3,057,441
SHOCK ABSORBER WITH REBOUND CUTOFF
Filed May 8, 1961

INVENTORS
JOHN F. PRIBONIC
NORMAN G. FOUTS
BY
*D. C. Staley*
THEIR ATTORNEY

United States Patent Office 3,057,441
Patented Oct. 9, 1962

3,057,441
SHOCK ABSORBER WITH REBOUND CUTOFF
John F. Pribonic and Norman G. Fouts, Dayton, Ohio, assignors to General Motors Corporation, Detroit, Mich., a corporation of Delaware
Filed May 8, 1961, Ser. No. 108,445
3 Claims. (Cl. 188—88)

This invention relates to hydraulic shock absorbers of the direct-acting, tubular type.

An object of the invention is to provide a shock absorber with a rebound cutoff to greatly increase the resistance to movement of the piston of the shock absorber in the final end portion of its rebound stroke, the rebound control arrangmenet being provided by a simplified structure and one that provides for greater ease of assembly of the related parts and the shock absorber piston.

Further objects and advantages of the present invention will be apparent from the following description, reference being had to the accompanying drawings wherein a preferred embodiment of the present invention is clearly shown.

Figure 1:
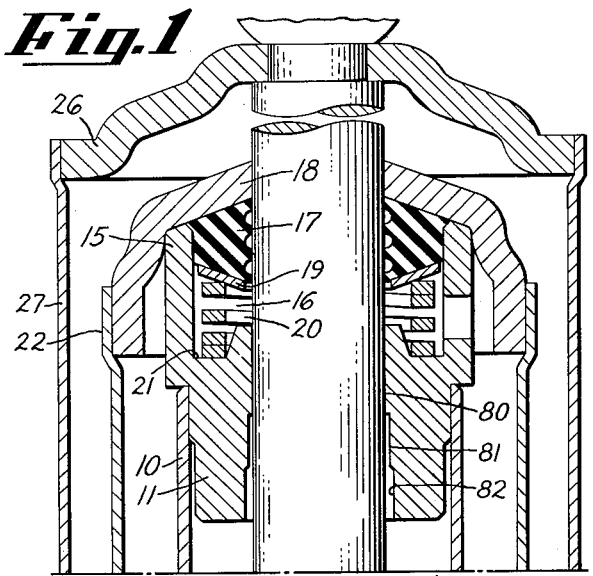
FIGURE 1 is a longitudinal cross-sectional view of a direct-acting shock absorber incorporating the feature of this invention.
Figure 2:
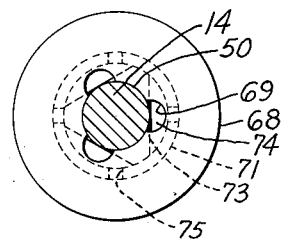
FIGURE 2 is a transverse cross-sectional view taken along line 2—2 of FIGURE 1.

As illustrated in the drawings, the shock absorber consists of a pressure cylinder 10 having a rod guide member 11 at one end thereof that forms a closure wall at one end of the pressure cylinder. The pressure cylinder 10 is also provided with the closure wall 12 at the opposite end thereof which also forms a part of a base valve structure more fully described hereinafter. A piston 13 is reciprocable in the cylinder 10 and divides the cylinder into a compression chamber A and a rebound chamber B. The piston 13 is carried on the lower end of a rod 14 that extends through the rebound chamber B and through the rod guide member 11, the rod 14 thus being guided in its reciprocal movement of the piston 13.

The closure member 11 includes an annular wall 15 forming a seal chamber 16 that contains a rod seal member 17 retained in the chamber 16 by a closure cap 18 that rests on the upper end of the wall 15. A seal retaining member 19 is held against the lower end of the seal member 17 by a compression spring 20 between the member 19 and the bottom wall 21 of the seal chamber 16. The closure cap 18 is secured to the upper end of a reservoir tube 22 that has its lower end secured to a closure cap 23 that encloses the closure wall 12 at the bottom end of the pressure cylinder 10. A plurality of ridges 24 support the closure wall 12 and the included base valve structure thereof in spaced relation to the cap 23 to form fluid flow passages for hydraulic fluid passing from the compression chamber A into the reservoir space 25 provided between the presure cylinder tube 10 and the reservoir tube 22.

The exterior end of the rod 14 supports a cap 26 that in turn supports a dust tube or stone shield 27 that prevents injury or denting of the reservoir tube 22.

The closure wall 12 is a part of a base valve structure that includes a first valve member 30 having a flanged portion 31 seated on the wall seat 32 by means of a light finger spring 33 to close the central axial port 34, but which light finger spring 33 allows the valve member 30 to lift from its seat to provide for substantially free flow of hydraulic fluid from the reservoir space 25 into the compression chamber A.

The valve member 30 carries a plug valve 40 having an axial bore 41 and a radial passage 42 that provides for flow of hydraulic fluid from the compression chamber A past the seat 43 of the valve 40 as urged against the compression spring 44 by fluid pressure in the compression chamber A to allow for exhaust of hydraulic fluid under pressure from the compresison chamber into the reservoir space 25 during the compression stroke of the shock absorber.

The rod 14 is provided with a reduced diameter portion 50 at the lower end thereof that receives the piston 13, the reduced diameter portion 50 of the rod extending through the piston 13 and receiving a retaining nut 51 on the terminus end of the reduced diameter rod portion 50 by means of a threaded connection between the rod portion 50 and retaining nut 51.

The piston 13 is provided with a first series of axially positioned passage means 55 which are disposed in the piston 13 on a common circle about the axis of the piston, the passage means 55 consisting of a plurality of individual passages. The upper ends of the passage means 55 are in fluid connection with a recessed chamber 56 provided in the upper face of the piston 13 at the rebound chamber side of the piston so as to receive hydraulic fluid from the rebound chamber B in a manner hereinafter described. The lower ends of the passage means 55 are closed by a disc valve means 57 which allows fluid flow from the rebound chamber into the compression chamber A but which resists or prevents return flow. The disc valve 57 is retained on its valve seat, or seats 58 by means of a compression spring 59 held between a retaining ring 60 and the flanged end 61 of the retaining nut 51.

The piston 13 is provided with a second series of valved passage means 65 arranged as a plurality of individual passages in a common circular arrangement in the piston 13 and disposed axially therein. These passage means 65 are normally closed by a disc valve means 66 held on its seat, or seats, by a spring 67, the disc valve 66 and the spring 67 being retained in position by a valve backing disc 68 positioned on the upper face of the piston 13 and which partially closes the recessed chamber 56.

Figure 3:
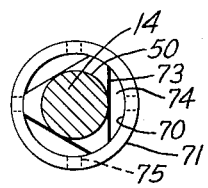
FIGURE 3 is a transverse cross-sectional view taken along line 3—3 of FIGURE 1.

The valve backing disc 68 is provided with a plurality of passages 69 providing fluid communication between the recessed chamber 56 and a chamber space 70 provided between the reduced diameter portion 50 of the rod 14 and a cylinder sleeve 71 retained between the valve backing disc 68 and a shoulder 72 on the rod 14 provided at the upper terminus end of the reduced diameter portion 50 of the rod. The sleeve 71 is disposed concentric with the axis of the rod 14 by means of radially extending protrusions 73 and 74, the protrusions 73 being of a more or less triangular shape in plan view, as shown in FIGURE 3 to allow for fluid flow through the chamber space 70.

The upper end of the sleeve 71 is provided with a plurality of openings 75 positioned remotely from the piston 13 in the direction of the rod guide 11, the passages 75 providing for hydraulic fluid flow from the rebound chamber B into the chamber space 70 from whence the fluid can flow through the passages 69 in the valve backing disc 68 and thence into the recessed chamber 56 in the piston 13 for flow through the passage means 55 into the compression chamber A under the resistance of the action of the disc valve means 57.

The rod guide member 11 is provided with a rod guide portion 80 in which the rod 14 reciprocates. Immediately below the guide portion 80 there is provided a portion 81 of slightly increased diameter and below that a second portion 82 of again slightly increased diameter. These portions 82 and 81 cooperate with the opening 75 in the sleeve 71 to restrict flow of hydraulic fluid from the rebound chamber B when the piston approaches the end of its rebound stroke, the opening 75 first entering the enlarged portion 82 in the rod guide 11 to give a first increase to resistance to flow of hydraulic fluid from the rebound chamber B which is increased when the passages 75 enter the portion 81 in the rod guide 11 and is then completely cut off from flow from the rebound chamber B when the passages 75 enter the guide portion 80 of the rod guide 11. This latter entraps the hydraulic fluid between the rod guide 11 and the piston 13 to highly restrict the further movement of the piston 13 toward the rod guide 11 in the end portion of the rebound stroke of the shock absorber.

During the compression stroke, the shock absorber functions normally with the base valve member 40 restricting hydraulic fluid flow from the compression chamber during the compression stroke and valve element 30 providing for substantially free return flow of hydraulic fluid into the compression chamber A during the rebound stroke.

Figure 5:
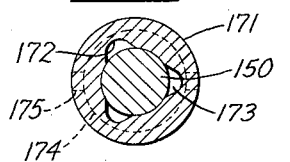
FIGURE 5 is a transverse cross-sectional view taken along line 5—5 of FIGURE 4.

In FIGURE 5 there is illustrated a modified arrangement of the rod and sleeve to provide axially directed passages between the rod and the sleeve around the same. In this arrangement, the rod 150 is cylindrical in contour throughout its length in the area through which it extends through the sleeve 171. The sleeve 171 has a plurality of axially extending grooves 172 spaced equidistantly around the periphery of the rod 150 to provide axial passages 173 through which the hydraulic fluid can flow between the compression chamber A and the rebound chamber B. These axially directed passages terminate at the plate 168 at one end for connection with the chamber 156 in the same manner heretofore described with reference to FIGURE 1. The opposite ends of the passages 173 communicate with an annular chamber 174 from which the ports 175 provide for communication with the rebound chamber B.

Figure 4:
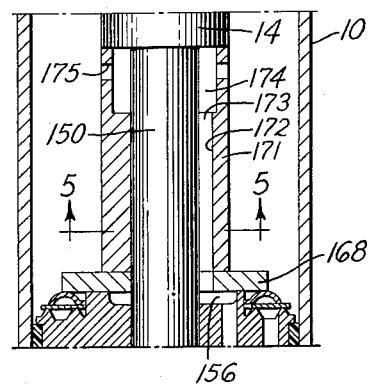
FIGURE 4 is a longitudinal cross-sectional view of a portion of the shock absorber illustrating a modified arrangement of the rebound cutoff control arrangement.

In operation, the structural arrangement of the device of FIGURES 4 and 5 is the same as that heretofore described.

While the embodiments of the present invention as herein disclosed constitute preferred forms, it is to be understood that other forms might be adopted.

What is claimed is as follows:

1. In a hydraulic shock absorber, rebound control mechanism including in the combination, a pressure cylinder, a reciprocable piston dividing said cylinder into compression and rebound chambers at opposite sides of the piston, first valved passage means in said piston providing for hydraulic fluid flow from said rebound chamber to said compression chamber, a second valved passage means in said piston providing for hydraulic fluid flow from said said compression chamber to said rebound chamber, a rod member extending into said cylinder through said rebound chamber through a rod guide which closes one end of the rebound chamber, said rod having a reduced diameter portion at the end thereof on which said piston is secured, said reduced diameter rod portion extending from said piston a substantial distance beyond said piston at the rebound chamber side thereof and forming an annular shoulder, said piston having a recessed chamber in the face thereof at the rebound chamber side thereof, a valve backing disc on the rebound side of said piston covering said recessed chamber and axially positioned on said piston by said reduced diameter portion thereof and extending radially over valve means on said piston valving said second passage means in said piston and retaining the same on said piston, and a cylinder sleeve wall encircling said reduced diameter portion of said rod in spaced relation thereto retained between said shoulder and said disc and forming with said reduced diameter rod portion an annular chamber space at the rebound chamber side of said piston, said backing disc having passage means through the same for fluid connection between said recessed chamber and said chamber space, said sleeve wall having radial opening means therein positioned remotely from said piston toward said rod guide end of said rebound chamber normally open for hydraulic fluid flow therethrough and through said chamber to said first passage means during the rebound stroke of said piston and movable into said rod guide as the same piston approaches the rod guide in the end portion of the rebound stroke to cut off the said fluid flow from the rebound chamber and entrap hydraulic fluid in the rebound chamber between said rod guide and said piston.

2. In a hydraulic shock absorber, rebound control mechanism including in the combination, a pressure cylinder, a reciprocable piston dividing said cylinder into compression and rebound chambers at opposite sides of the piston, first valved passage means in said piston providing for hydraulic fluid flow from said rebound chamber to said compression chamber, second valved passage means in said piston providing for hydraulic fluid flow from said compression chamber to said rebound chamber, a rod member extending into said cylinder through said rebound chamber through a rod guide which closes one end of the rebound chamber, said rod having a reduced diameter portion at the end thereof on which said piston is secured, said reduced diameter rod portion extending from said piston a substantial distance beyond said piston at the rebound chamber side thereof and forming an annular shoulder, said piston having a recessed chamber in the rebound chamber side thereof, a valve backing disc on the rebound side of said piston covering said recessed chamber and extending radially over valve means on said piston valving said second passage means in said piston and retaining the same on said piston, and a cylinder sleeve encircling said reduced diameter portion of said rod in spaced relation thereto retained between said shoulder and said disc and forming with said reduced diameter rod portion an annular chamber space at the rebound chamber side of said piston, said reduced diameter portion of said rod within said sleeve having protrusions thereon positioning said sleeve concentrically with the said reduced diameter portion of said rod, said backing disc having passage means through the same for fluid connection between said recessed chamber and said chamber space, said sleeve having opening means therein positioned remotely from said piston toward said rod guide end of said rebound chamber normally open for hydraulic fluid flow therethrough and through said chamber space to said first passage means during the rebound stroke of said piston and movable into said rod guide as the said piston approaches the rod guide in the end portion of the rebound stroke to cut off the said fluid flow from the rebound chamber and entrap hydraulic fluid in the rebound chamber between said rod guide and said piston.

3. In a hydraulic shock absorber, rebound control mechanism including in the combination, a pressure cylinder, a reciprocable piston dividing said cylinder into compression and rebound chambers at opposte sides of the piston, first valved passage means in said piston providing for hydraulic fluid flow from said rebound chamber to said compression chamber, second valved passage means in said piston providing for hydraulic fluid flow from said compression chamber to said rebound chamber, a rod member extending into said cylinder through said rebound chamber through a rod guide which closes one end of the rebound chamber, said rod having a reduced diameter portion at the end thereof on which said piston is secured, said reduced diameter rod portion extending from said piston a substantial distance beyond said piston at the rebound chamber side thereof and forming an annular shoulder, said piston having a recessed chamber in the rebound chamber side thereof, a valve backing disc on the rebound side of said piston covering said recessed chamber and extending radially over valve means on said piston valving said second passage means in said piston and retaining the same on said piston, and a cylinder sleeve encircling said reduced diameter portion of said rod in spaced relation thereto retained between said shoulder and said disc and forming with said reduced diameter rod portion an annular chamber space at the rebound chamber side of said piston, said sleeve having inwardly extending protrusions engaging the reduced diameter portion of said rod to concentrically position said sleeve around the said reduced diameter portion of said rod, said backing disc having passage means through the same for fluid connection between said recessed chamber and said chamber space, said sleeve having opening means therein positioned remotely from said piston toward said rod guide end of said rebound chamber normally open for hydraulic fluid flow therethrough and through said chamber space to said first passage means during the rebound stroke of said piston and movable into said rod guide as the said piston approaches the rod guide in the end portion of the rebound stroke to cut off the said fluid flow from the rebound chamber and entrap hydraulic fluid in the rebound chamber between said rod guide and said piston.

References Cited in the file of this patent

UNITED STATES PATENTS

| | | |
|---|---|---|
| 2,606,630 | Rossman | Aug. 12, 1952 |
| 2,907,414 | Patriquin | Oct. 9, 1959 |
| 2,924,304 | Patriquin | Feb. 9, 1960 |